June 18, 1946.  W. S. TAYLOR  2,402,352
BULLDOZER GRADING ATTACHMENT FOR CRAWLER TRACTORS
Filed April 7, 1944
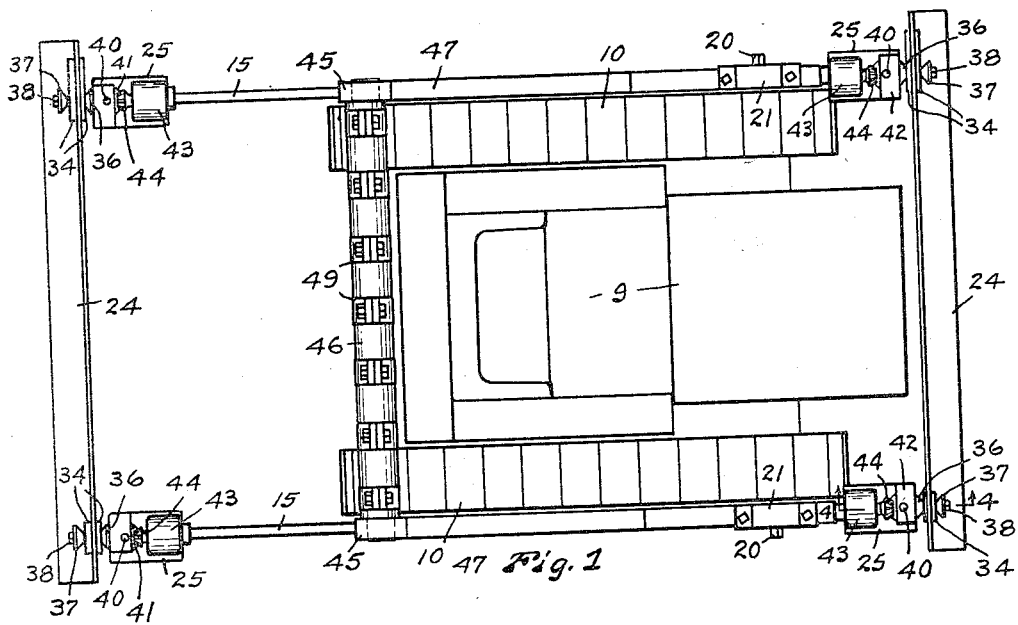
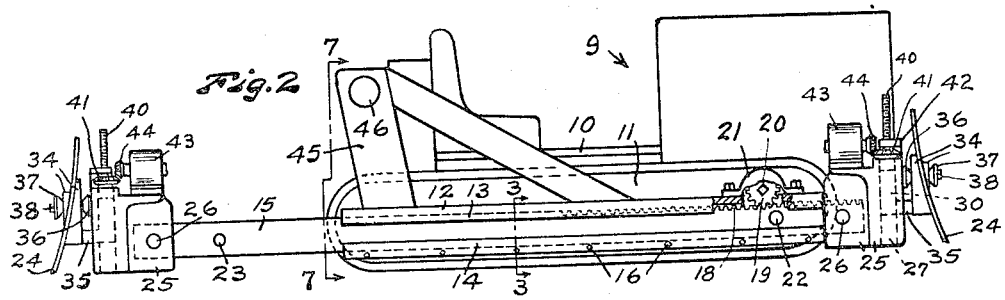
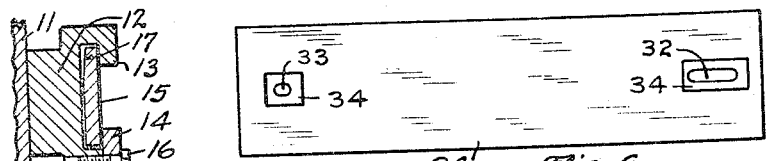
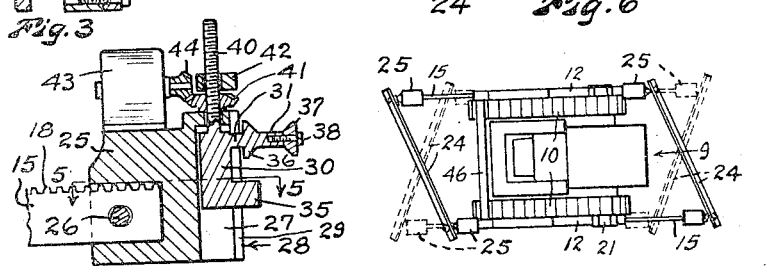
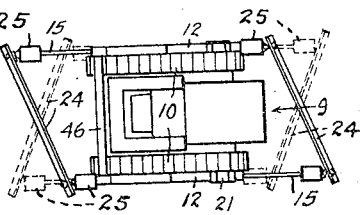
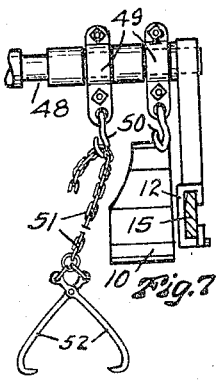
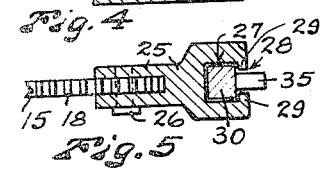
INVENTOR.
William Sneed Taylor
BY
Fred C. Matheny
ATTORNEY Patented June 18, 1946

2,402,352

UNITED STATES PATENT OFFICE 2,402,352

BULLDOZER GRADING ATTACHMENT FOR CRAWLER TRACTORS

William Sneed Taylor, Seattle, Wash.

Application April 7, 1944, Serial No. 530,013

7 Claims. (Cl. 37—144)

This invention relates to grading and hoisting attachments for crawler tractors.

An object of this invention is to provide grading and hoisting attachments for crawler tractors that are highly efficient in clearing ground and moving earthy material, such for instance as clearing and grading a right of way.

Another object is to provide grading and hoisting attachments of strong and simple construction that are durable and efficient in operation, that do not require precision work in their manufacture and that are not expensive to produce.

Another object is to provide crawler tractor attachments that make possible land clearing and grading at a substantial saving in time and labor, which means a substantial saving in the cost of such clearing and grading.

Another object is to provide bulldozer attachments for a crawler tractor that may very quickly and easily be applied to and removed from the tractor, thus making it convenient to relieve the tractor of the bulldozer attachments when the tractor is to be used for work other than bulldozing or grading and to pick up these attachments when bulldozing or grading work is to be done.

Another object is to provide bulldozer attachments for a crawler tractor in which a bulldozer blade is provided at each end of the tractor and in which said blades are very quickly and easily adjusted into different operative positions.

Another object is to provide hoisting and hauling means by which one or more objects, such as logs that are to be moved, can be quickly and easily made fast to the tractor and moved thereby either when the bulldozer attachments are connected with the tractor or are disconnected therefrom.

Other objects of the invention will be apparent from the following description and accompanying drawing.

In the drawing:

Fig. 1 is a plan view showing bulldozer means and hoisting and hauling means constructed in accordance with my invention as they may appear when installed on a crawler tractor, the tractor being somewhat diagrammatically shown.

Fig. 2 is a view in side elevation of the same, parts being broken away.

Fig. 3 is a sectional view on a larger scale than Fig. 2, taken substantially on broken line 3—3 of Fig. 2.

Fig. 4 is a sectional view, on a larger scale than Fig. 1, taken substantially on broken line 4—4 of Fig. 1.

Fig. 5 is a sectional view taken substantially on broken line 5—5 of Fig. 4.

Fig. 6 is a detached view in front elevation of a bulldozer blade which may be used in connection with my invention.

Fig. 7 is a fragmentary end view with parts in section looking in the direction of broken line 7—7 of Fig. 2 and showing a portion of the hoisting and hauling means.

Fig. 8 is a diagrammatic view on a smaller scale than the other views showing angular positions into which the bulldozer blades may be adjusted.

Like reference numerals designate like parts throughout the several views.

In the drawing 9 designates a crawler tractor having the usual endless type treads 10 and having rigid track frame members 11 positioned within the treads 10.

In accordance with my invention two longitudinally extending guide bars 12 are positioned alongside of the treads 10 at each side of the tractor and are rigidly secured to the frame members 11. Each guide bar 12 has a downwardly extending top flange 13 and an upwardly extending bottom flange 14 on its outer side. The flanges 13 and 14 of each guide bar 12 cooperate with the guide bar to form a suitable channel or trackway for slidably receiving a bulldozer extension bar 15. One of the extension bars 15 is provided at each side of the tractor. Preferably each lower flange 14 is removably secured to its guide bar 12 as by bolts 16.

One side of each extension bar 15 is preferably beveled near the top edge thereof, as indicated by 17, to facilitate insertion and removal of the extension bar 15 from the guide bar 12 and flange 13 when the lower flange member 14 is removed.

Each extension bar 15 has rack teeth 18 on its top edge that mesh with a pinion or gear member 19. Each gear member 19 is secured to a shaft 20 that is journaled in a gear housing 21. Each gear housing 21 is secured to one of the guide bars 12. The shafts 20 may be manually turned by applying a crank thereto to adjust the extension bars 15 longitudinally.

The extension bars 15 are rigidly held in any desired position by inserting pins or bolts 22 into suitable holes 23 in the extension bars 15 and guide bars 12.

Four mounting devices for bulldozer blades 24 are connected with the four ends of the two extension bars 15. Each mounting device comprises a mounting block 25 having a recess to receive an end portion of an extension bar 15 to which said block 25 is secured by a removable pin 26. Each mounting block 25 is provided with an upright passageway 27. An upright slot 28 extends from the passageway 27 to the front side of the mounting block 25 and two flanges 29 that overhang the passageway 27 are provided at the sides of the slot 28.

A vertically adjustable bar 30 is slidably disposed in each passageway 27. A stud pin 31, rigid with the bar 30, extends outwardly from said bar 30 through the slot 28 and through a suitable horizontally elongated hole 32 or 33 in the adjacent bulldozer blade 24. If the bulldozer blade is made of sheet steel, as illustrated in the drawing, then reinforcing chambers 34 are preferably welded or otherwise rigidly secured to said blade at the location of the holes 32 and 33.

The reinforcing members 34 on the back of the blades 24 extend downwardly for a substantial distance toward the lower edge of the blade and are adapted to abut against stop members 35 that are provided on the lower end portions of the bars 30. The stop members 35 extend outwardly through the slot 28.

A blade supporting member 36 with a conical bearing face is provided on each stud pin 31 for the adjacent reinforcing member 34 of the blade 24 to bear against. A blade holding member 37, also provided with a conical face, is secured to each stud pin 31, as by a cap screw 38, and serves to secure the blade 24 on the stud pin. The conical faces of the members 36 and 37 can be positioned fairly close to the blade 24 when said blade is at right angles to the tractor, as shown in Fig. 1, and will still allow the blade 24 to be moved into the required inclined positions, as shown in Fig. 8. Thus simple and efficient means are provided for allowing angular adjustment of the blade 24 without allowing an undesirable amount of lost motion between the blade 24 and the stud pins 31.

A screw threaded stem 40 is rigidly secured to each bar 30 and extends upwardly therefrom through the hub of a threaded bevel gear 41. A bearing member or cap 42 rigid with each mounting block 25 extends over the adjacent pinion 41 and the threaded stem 40 extends upwardly through this cap 42. A reversible electric motor 43 is carried on each mounting block 25 and a bevel gear 44 on the shaft of each motor 43 meshes with one of the bevel gears 41 for driving the same in either direction. The means by which the driver of the tractor controls the motors 43 is not a part of this invention and may be of any well known type which will make it possible for the driver to use the motors to raise and lower the bulldozer blades 24 at will.

Hoisting devices provided in connection with this tractor comprise two upright supports 45 rigidly secured to the rear end portions of the guide bars 12 and extending upwardly therefrom. A hoisting bar 46, preferably of cylindrical shape is carried by the supports 45 and extends crosswise of the rear end portion of the tractor. Inclined truss braces 47 are provided for the upright supports 45. The hoisting bar 46 is provided at intervals with annular grooves 48 to receive eye members or shackles 49 to which hooks 50 are connected. Load hoisting and hauling means of any suitable form may be connected with the hook 50. This means may conveniently be a chain 51 and tongs 52 of well known form if this tractor is being used to hoist and haul logs.

When the machine is to be used as a bulldozer for moving material in the direction in which the tractor is traveling then the bulldozer blades are positioned crosswise of the tractor, as shown in Fig. 1, and the mounting blocks 25 that carry the blade 24 with which the material is to be moved, that is either at the front or rear of the tractor, are permitted to abut against the adjacent ends of the guide bars 12. This provides a rigid support for the mounting blocks of the blade with which material is being pushed and relieves the extension bars 15 of substantially all strain. Also this positions the blade that is in use as close as possible to the tractor. It will be understood that if the pins 22 are removed and the extension bars 15 left free to move in the guide bars 12—13—14 then pressure against either blade will move that blade back into close proximity to the tractor.

When the machine is to be used as a grader to move material sidewise then the blades are set in an inclined position as shown in Fig. 8, and pins 22 are inserted to prevent longitudinal movement of one or both of the extension bars 15 in their guide bars. If the blades 24 are thus set at an incline and the tractor is moved in a straight line then the blade that is being pushed against the material to be moved will deflect said material sidewise after the fashion of a grader.

The blades 24 may be set to deflect material to either side of the tractor as indicated by the full line and dotted line positions respectively, in Fig. 8.

When the blades are in an angular position, as shown in Fig. 8, one mounting block 25 of each blade 24 is always pressed against an end of one of the guide members 12. Thus the side thrust will be taken through this closely coupled mounting block 25 and the extension bar 15 at the other side of the machine will be relieved of bending strains due to the side thrust.

The lost motion afforded by the longer slot 32 in each bulldozer blade together with the loose connections afforded by the pins 31 and cone faced members 36 and 37 provide automatic adjustment of the blades 24 relative to the pins 31 by which they are supported when the angular position of the blades is changed. This avoids subjecting the extension bars 15 to bending strains when the angular positions of the blades are changed.

The extension bars 15 can be disengaged from the guide bars 12—13—14 in two different ways. One way is by withdrawing pins 26 and disengaging the mounting blocks 25 at the right, Fig. 2, and then separating the extension bars 15 from the guide means by relative longitudinal movement. Another way is by disengaging the mounting blocks 25 at both ends of the guide bars and detaching the lower flange members 14 and then removing the extension bars sidewise from the guide means 12—13.

When this machine is in use the usual method of detaching the bulldozer attachments will be to lower the blade 24 at the front of the tractor onto the ground, detach the mounting blocks 25 at that end from their extension arms 15 by removing the pins 26, back the tractor away from the front blade assembly, lower the blade 24 at the rear of the tractor onto the ground and then move the tractor forwardly away from the rear blade assembly. In this way the guide members 12—13—14 will be slipped off of the extension bars 15. A reverse sequence of operations may be followed in re-assembling the bulldozer parts on the tractor.

If desired the bulldozer blades may be used for pushing around and moving objects such as logs that are to be moved. It is also possible to remove the bulldozer blades and use the mounting blocks 25 to push such objects around. For instance if a log has been sawed crosswise, it may be desirable to drive the tractor against the sawed portions of this log and thus push the two pieces of log apart so that they will be alongside of the tractor where they may be readily hitched onto.

Objects, such as logs, may be moved, either when the bulldozer attachments are on the tractor and the rear blade 24 is positioned as closely as possible to the rear end of the tractor, or when the bulldozer attachments are disconnected from the tractor.

Any desired number of such objects, up to the capacity of the tractor, may be connected, as by the chain and tong means 50—51 to the tractor to be hauled thereby. The bar 46 is high enough so that the forward ends of logs that are being hauled thereby will be hoisted well off of the ground thus preventing these logs from digging into obstruction and making it easier to haul them.

Obviously changes in my invention may be made within the scope and spirit of the following claims.

I claim:

1. In bulldozer grading attachments for a crawler tractor, a guide member fixedly secured to the tractor frame and extending longitudinally thereof along the outer side of a tractor tread member; an extension bar extending through said guide member and slidable therein; and a blade member connected with each end portion of said extension bar.

2. In bulldozer grading attachments for a crawler tractor, two guide members fixedly secured to the tractor frame and extending longitudinally thereof adjacent the respective outer sides of the tractor treads; extension bars slidably and removably supported in said guide members and extending through said guide members and protruding in opposite directions from said guide members; and two bulldozer blades at opposite ends of the tractor carried by said extension bars, each extension bar being connected with a blade at each end of the tractor.

3. In bulldozer grading attachments for a crawler tractor, two guide members fixedly secured to the tractor frame and extending longitudinally thereof adjacent the respective outer sides of the tractor treads; extension bars slidably and removably supported in said guide members and extending through said guide members and protruding in opposite directions from said guide members; means for locking said extension bars in adjusted positions relative to said guide members; and two bulldozer blades at opposite ends of the tractor carried by said extension bars, each extension bar being connected with a blade at each end of the tractor.

4. In bulldozer grading attachments for a crawler tractor, two guide members fixedly secured to the tractor frame and extending longitudinally thereof adjacent the respective outer sides of the tractor treads; extension bars slidably and removably supported in said guide members and extending through said guide members and protruding in opposite directions from said guide members; means for locking said extension bars relative to said guide members; means for adjustably moving said extension bars longitudinally; and two bulldozer blades at opposite ends of the tractor carried by said extension bars, each extension bar being connected with a blade at each end of the tractor.

5. In bulldozer grading attachments for a crawler tractor, two guide members fixedly secured to the tractor frame and extending longitudinally thereof adjacent the respective outer sides of the tractor treads; extension bars slidably and removably supported in said guide members and extending through said guide members and protruding in opposite directions from said guide members; means for locking said extension bars relative to said guide members; means for adjustably moving said extension bars longitudinally; two bulldozer blades at opposite ends of the tractor carried by said extension bars, each extension bar being connected with a blade at each end of the tractor; and means for raising and lowering said bulldozer blades.

6. In bulldozer grading attachments for a crawler tractor, two guide members rigid with the tractor frame and extending longitudinally thereof along the outer sides of the tractor tread members; two extension bars slidably supported in said guide members and extending beyond the ends of said guide members; a mounting block secured to each end portion of each extension bar, at least one mounting block on each extension bar being removable therefrom to permit the extension bars to be removed from the extension members by relative longitudinal movement; and bulldozer blades carried by said extension bars.

7. In bulldozer grading attachments for a crawler tractor, two guide members rigid with the tractor frame and extending longitudinally thereof along the outer sides of the tractor tread members; two extension bars slidably supported in said guide members and extending beyond the ends of said guide members; a removable flange on each of said guide members providing for convenient insertion and removal of the extension bar from the guide member; and two bulldozer blades at opposite ends of the tractor carried by said extension bars.

WILLIAM SNEED TAYLOR.